Jan. 25, 1966   R. J. PURTELL   3,230,969
IRRIGATION SYSTEM
Filed Dec. 12, 1963   5 Sheets—Sheet 1

FIG. 1

RUFUS J. PURTELL
INVENTOR.
BY
Atty.

Jan. 25, 1966  R. J. PURTELL  3,230,969
IRRIGATION SYSTEM
Filed Dec. 12, 1963  5 Sheets-Sheet 2

RUFUS J. PURTELL
INVENTOR.

RUFUS J. PURTELL
INVENTOR.

Jan. 25, 1966 R. J. PURTELL 3,230,969
IRRIGATION SYSTEM
Filed Dec. 12, 1963 5 Sheets-Sheet 4

INVENTOR
Rufus J. Purtell

United States Patent Office 3,230,969
Patented Jan. 25, 1966

3,230,969
IRRIGATION SYSTEM
Rufus J. Purtell, Brownfield, Tex., assignor, by mesne assignments, to The J. B. Knight Co., Inc., Brownfield, Tex., a corporation of Texas
Filed Dec. 12, 1963, Ser. No. 331,087
13 Claims. (Cl. 137—1)

This invention relates to agricultural irrigation and more particularly to a system for moving irrigation sprinkler pipes.

This application is a continuation-in-part of my previous patent application entitled "Irrigation System" filed September 26, 1962, Serial No. 226,201, now abandoned.

An object of this invention is to provide means for moving an agricultural irrigation pipe across a field.

Another object is to provide movable support so that the number of vehicles required to support the pipe is reduced.

A further object is to provide means for preventing the movable support from interfering with travel of the pipe when the pipe is being moved longitudinally.

Still further objects are to achieve the above with a device that is sturdy, compact, durable, simple, and reliable, yet inexpensive and easy to manufacture.

Still further objects are to achieve the above with a method that is rapid, inexpensive, and easy for inexperienced, unskilled people to perform.

The specific nature of the invention as well as other objects, uses, and advantages thereof will clearly appear from the following description and from the accompanying drawings, the different view of which are not necessarily to the same scale, in which:

FIG. 4 is a detailed view of the attachment of one movable support to the pipe.

FIG. 5 is a perspective view of a second embodiment of this invention with longitudinal elements shown broken.

As may be seen in the accompanying drawings, more particularly FIGS. 1-4, one function of both vehicles 10 and movable support 12 is to support pipe 14 which carries a plurality of sprinklers 16 by which water is discharged on the growing crops.

The vehicles 10 also perform the function of periodically moving the pipe 14 transversely to a new land of the field for watering. The power for this purpose is supplied by shaft 18 which extends parallel to the pipe 14 from one vehicle 10 to the next. As will be described later, the shaft 18 can also supply power to move the system when the pipe 14 is moved longitudinally. Under normal conditions, the pipe will be drained of water by valves (not shown) when it is being moved. Such valves are well known in the art and therefore, will not be further shown or described here except to note that they work automatically to drain the water when the pressure on the pipe 14 is relieved.

Inasmuch as the pipe 14 is lighter when being moved because of the absence of the water therein, it does not need as much support while being moved as is required while it is stationary. Therefore, I have found that it is possible to reduce the number of vehicles 10 required by using movable supports 12 about equally spaced between the vehicles 10. The movable supports 12 support the pipe 14 while it is stationary but do not support the pipe during transportation.

Each movable support 12 includes clamp 20 which encircles the pipe 14 which is an elongated cylinder. Therefore, the clamp 20 is means for clamping itself to an elongated cylinder. The axis of shaft bearing 22 is parallel to and below the axis of the elongated cylinder (pipe 14) of the clamp 20. The shaft 18 is journaled for rotation within the shaft bearing 22. The bearing 22 is rigidly connected to the clamp 20 by a pair of depending straps 24. The bearing 22 extends the length of the clamp 20. i.e. from one strap 24 to the other. Sleeve 26 is journaled around the bearing 22 between the straps 24. Tab 28 depends from the sleeve 26. Plate 30 is pivoted to the sleeve 26 by bolt 32 which extends through a hole in the tab 28 and plate 30 transverse of the axis of the bearing 22. Normally the plate 30 is held non-rotatably to the sleeve 26 by second bolt 34 which is removable. Therefore, when second bolt 34 is removed the plate 30 may be rotated for purposes described later. Two legs 36 are rigidly attached to plate 30 and depend therefrom. Arcuate foot 38 of a large area is on the bottom of the legs 36. The legs 36 are contained within a plane transverse to pipe 14 and by means of the sleeve 26 around the bearing 22 are mounted to swing within this plane. The foot 38 also extends in the plane transverse to pipe 14. As may be seen in FIG. 2, the legs 36 diverge. Also it may be seen that each leg has heel 39 extending below the junction of that leg 36 with the foot 38 to dig in the ground if the heel is in a proper position to do so.

When the pipe 14 begins to move transversely, the foot 38 will remain stationary on the ground, and therefore the leg 36 will be rotated about the bearing 22. Therefore, as the pipe is moved, the movable support 12 with legs 36 will trail behind the pipe 14 like a tail. When the desired location is reached, the vehicles 10 and the pipe 14 are reversed for a short distance. This reversal of the vehicles 10 and pipe 14 causes the heel 39 to enter the ground preventing movement of the foot 38 relative to the ground. Thus the pipe 14 is moved onto the movable support 12 and partially supported by it. One vehicle 10 with somewhat complex parts and considerable mechanism is replaced by one movable support 12 which has few parts and extremely simple construction.

Each vehicle 10 has a clamp for rigidly securing it to the pipe 14. The clamp includes elongated structural member 42 beneath the pipe 14 with a plurality of bands 44 encircling the pipe 14 attached to the elongated structural member 42. The structural member 42 is attached to one of the arms 46 of the frame of the vehicle 10. Arm 48 is hinged at 50 to the arm 46. Each arm includes at least two tubular members, each of which extends from near an end of the elongated member 42 and terminates at vertical bearing 52. Therefore, one of the vertical bearings 52 is at either end of the frame itself. Bracket 54 is mounted for rotation within each vertical bearing 52. Each bracket 54 has as a part thereof horizontal spindle 56 upon which is mounted wheel 58. The bracket 54 is primarily in the form of a bent shaft which has the horizontal portion of it forming the spindle 56 and the vertical portion of it journaled within the bearing 52. Yoke 60 is attached to the shaft by pin 62 above the bearing 52. The yoke is a part of the bracket 54. Bracket sheave 64 is nonrotatably attached on shaft 66 which is mounted for rotation within the yoke 60. The shaft 66 also carries sprocket 68 which by chain 70 drives sprocket 72 which is securely attached to wheel 58. Inasmuch as the yoke 60 rotates and bears a fixed relationship to the spindle 56, at all times the rotation of the bracket sheave 64 results in rotation of the wheel 58.

A section of shaft 18 is journaled for rotation within hangers 76 which depend from the elongated clamp member 42 which is part of the frame. Two drive sheaves 78 are mounted on the shaft 18 between hangers 76. Sleeve 80 is attached to each of the arms 46 by welding or otherwise. Two idler pulleys 84 are mounted at the terminal of each strut 82. The strut 82 is adjustable longitudinally within the sleeve 80 for the purpose of adjusting the tension of belt 86. The idlers 84 are located immediately above the axis of rotation of bracket 54. Belt 86 is trained over drive sheave 78, one of the idlers 84, down to the bracket sheave 64, back to the other idler 84 above it, and back to the drive sheave 78. Inasmuch as the bracket sheave 64 is below the idler 84, regardless of the rotation of the bracket 54 within vertical bearing 52, the distance between the sheaves will not change and that the belt 86 will continue to run true on the pulleys and sheaves.

Figure 1:
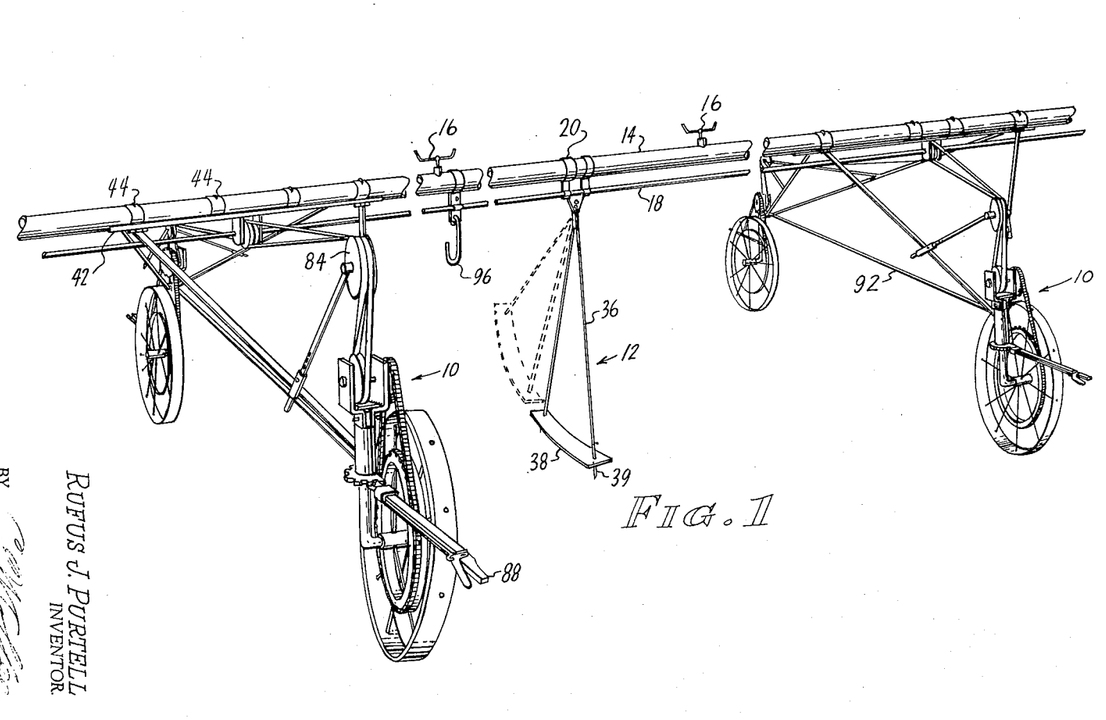
FIG. 1 is a perspective view of an embodiment of this invention with longitudinal elements shown broken.
Figures 1A, 2:
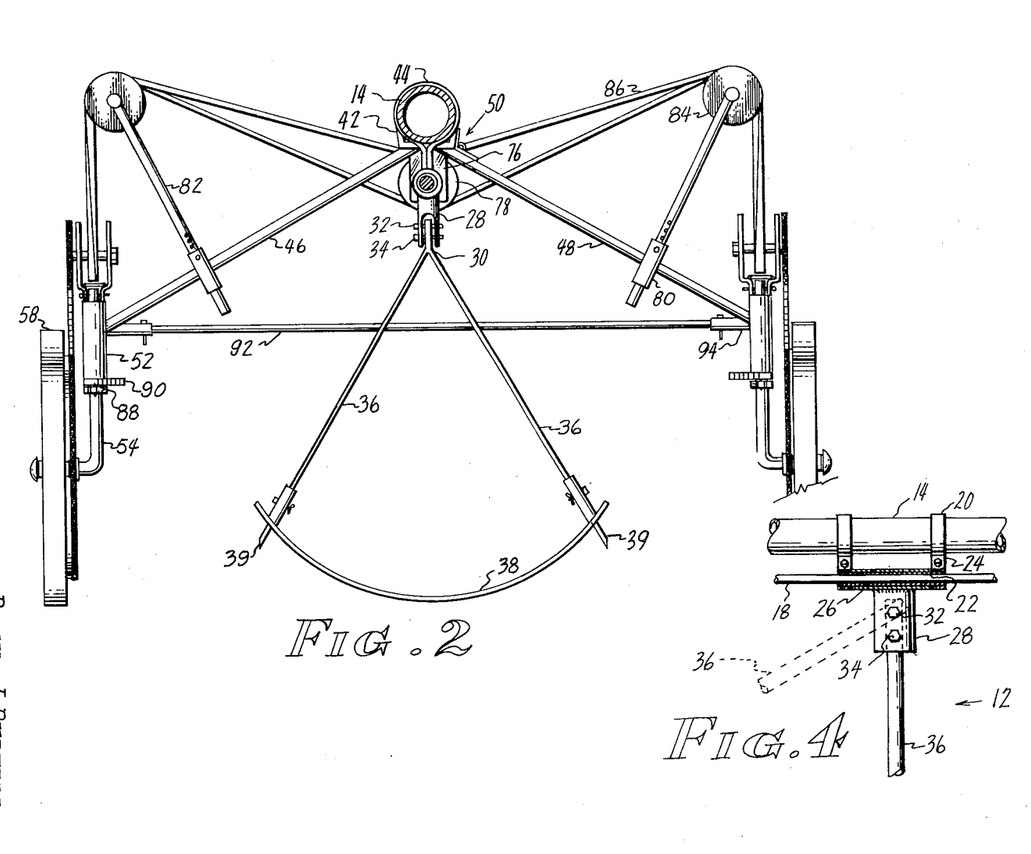
FIG. 2 is a sectional view of the invention shown in FIG. 1 with the wheels shown rotated to move the system longitudinally of the pipe.
Figure 3:
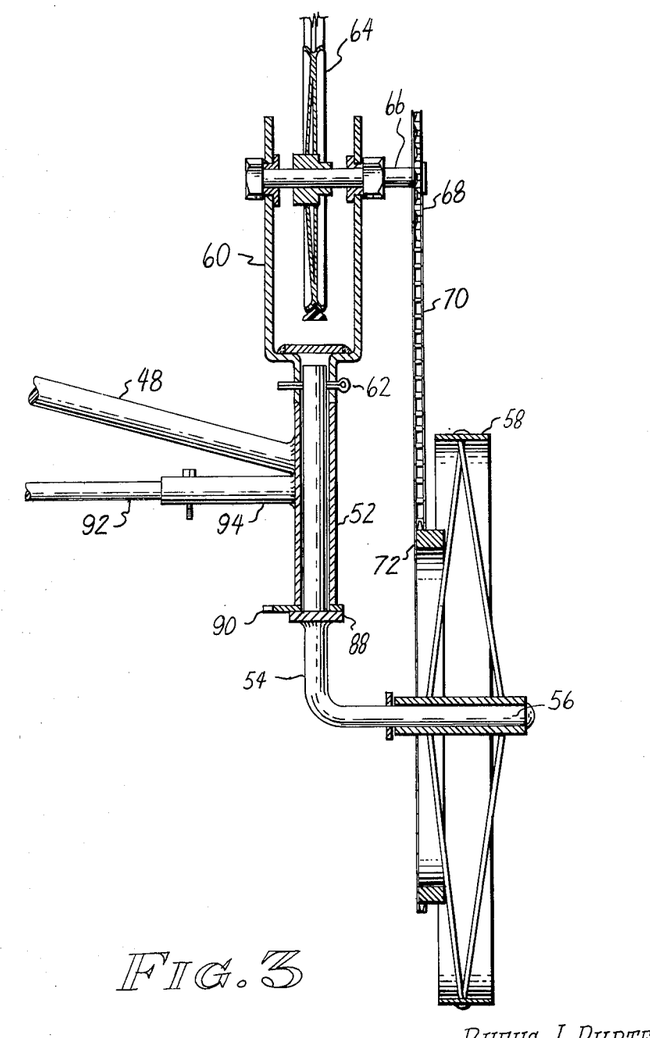
FIG. 3 is a sectional view of one wheel and bracket assembly of one vehicle.

The bracket 54 is rotated within the bearing 52 by means of handle 88 which is securely fastened to the bracket 54. As shown, it is attached by welding or otherwise to that cylindrical part of the bracket immediately below the bearing 52. In this respect, it acts as a stop to prevent the bearing 52 from sliding down the bracket 54. Toothed sector 90 is attached to the lower portion of the bearing 52. The toothed sector cooperates with a releasable dog upon the handle 88 to maintain the bracket 54 in the position to which it has been moved by the handle 88. I.e. as shown in FIG. 1 the wheels are shown with their horizontal spindles 56 parallel to the pipe 14 and are maintained in that position by a dog on the handle within a selected place of the toothed sector 90. In FIGS. 2 and 3, the wheels are shown with brackets 54 rotated 90 degrees from the position shown in FIG. 1. They are maintained in this position by a dog in a selected portion of the toothed sector 90. Of course, other intermediate positions may be selected but it will be seen that means are provided for maintaining the bracket in either of at least two selected positions.

As has been described, the frame includes arms 46 and 48 which are hinged together at 50. Were brace 92 not present, the frame would unfold around hinge 50 and rest against the ground, if the movable support 12 were not in the way. For certain seasons of the year it is desirable to put the pipes on the ground to prevent them from being carried away by the wind. Therefore, the brace 92 is removably secured to the arms 46 and 48. Sleeve 94 is attached to each of the vertical bearings 52 and the brace 92 telescoped within the sleeves 94 and held in place by suitable pin.

Also it will be seen that with the brackets 54 rotatable about a vertical axis that the system may be moved either transverse of the pipe 14 or longitudinally thereof. Regardless of whether it is being moved transversely or longitudinally it is supplied by its own power from a prime mover (not shown) which rotates the shaft 18.

When the system is being moved longitudinally of pipe 14, it is desirable that the movable supports 12 should not drag the ground. Therefore, at such times the second bolt 34 may be removed between the plate 30 and the tab 28 and the legs 36 rotated to a position so that they lie along the pipe 14. The legs 36 may be maintained in this place by hook 96 conveniently attached to the pipe 14.

FIGS. 5, 6, 7, 10, 11, and 12 show a second embodiment of movable support 112. In FIG. 5, vehicles 110 have been represented somewhat schematically to emphasize that the movable support 112 could be used with any of several different types of vehicles for moving water carrying pipe 114.

As seen schematically in the drawing, each vehicle 110 has frame 100 upon which is mounted two wheels 102. Chain 104 is trained around sprocket 106 and around the two wheels 102. The sprocket 106 is secured to shaft 118 which is journaled for rotation within the frame 100 immediately below the water carrying pipe 114. Therefore, it may be seen that rotation of the shaft 118 in a first direction will cause movement of the vehicles 110 in a first direction and rotation of the shaft 118 in the reverse direction will cause movement of the vehicles 110 in said reverse direction.

Figures 9, 10:
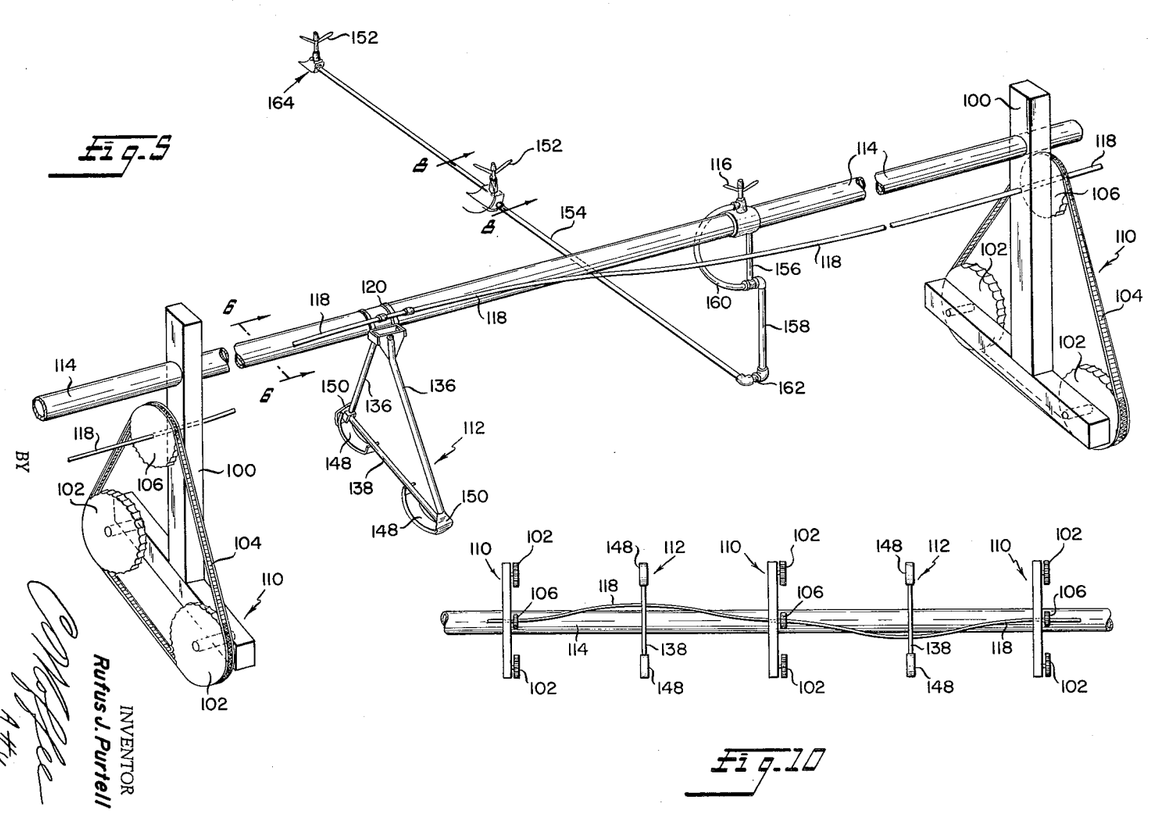
FIG. 9 is a sectional view of the sled unit taken on line 9—9 of FIG. 8.
FIG. 10 is a bottom view somewhat schematic showing the path of the drive shaft of the embodiment shown in FIG. 5.
Figure 9:
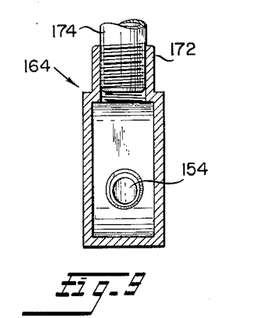

It will be noted that it is desirable to have the shaft 118 either vertically directly below the pipe 114 at each vehicle 110 or vertically directly above it. I choose to place the shaft 118 directly vertically below the pipe at each vehicle 110. However, it will be noted that at each movable support 112 it is desirable to have the shaft 118 alongside the pipe 114 so as not to interfere with free movement of the movable support 112. The shaft 118 is sufficiently flexible to extend from directly under the pipe 114 at each vehicle 110 and alongside the pipe at each movable support 112. However, if the flexible pipe 118 extends to the same side of the movable support 112 all along the line it tends to twist the pipe 114 inasmuch as the shaft 118 is attached to the vehicle at each vehicle 110. Therefore, I have caused the shaft 118 to be attached in front of the pipe 114 between one pair of vehicles 110 and behind the vehicles between the adjoining pair of vehicles 110 (FIG. 10).

Figures 6, 7, 12:
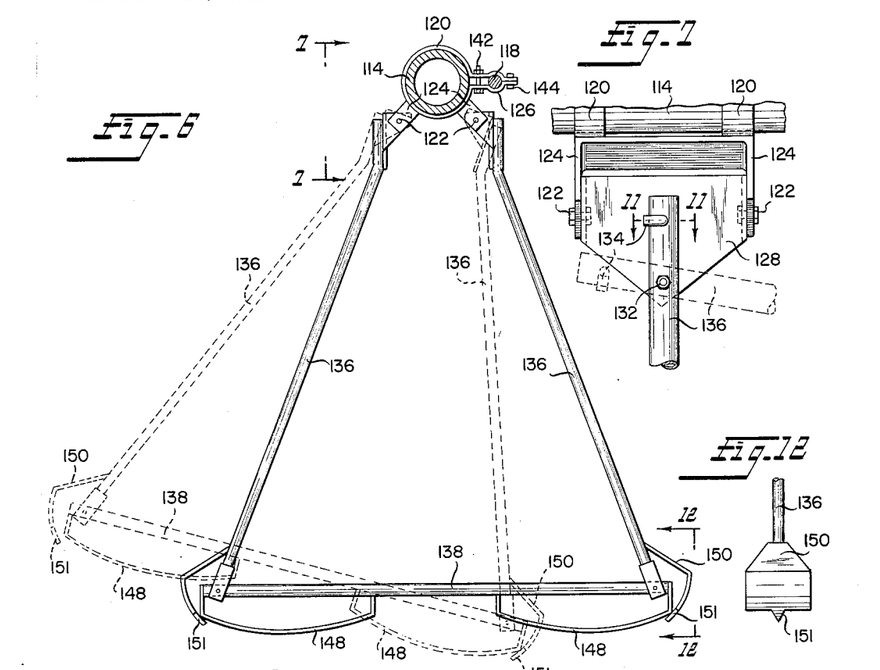
FIG. 6 is a sectional view of the invention shown in FIG. 5 taken on line 6—6 of FIG. 5.
FIG. 7 is a detailed view of the attachment of the movable support shown in FIGS. 5 and 6 taken on line 7—7 of FIG. 6.
FIG. 12 is a partial elevational view of the skid on the bottom of the movable support viewed from line 12—12 of FIG. 7.

Referring to FIGS. 6 and 7 for details of construction of the movable support 112, it will be seen that the movable support includes clamp 120 by which it is attached to the pipe 114. The clamp 120 has a cylindrical portion which surrounds the pipe 114. The clamp is secured to the pipe by clamp bolt 142. The shaft 118 is journaled within sleeve 126 which is a part of the clamp 120 and is secured in place by sleeve bolt 144. Two pair of ears 124 extend from the clamp 120. Each pair of ears 124 are aligned axially of the pipe 114 and the two pairs of ears are peripherally spaced about the pipe 114. Tab 128 is pivoted to each pair of ears 124 by means of pivot pins 122. A leg 136 is attached to each tab 128. Therefore, it may be seen that the two legs 136 are pivoted to the clamp 120 and thus the pipe 114 peripherally spaced about the pipe 114.

Figure 11:
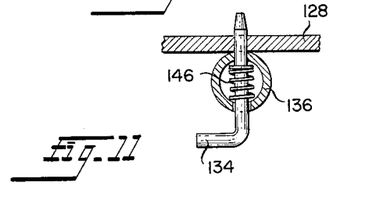
FIG. 11 is a partial sectional view taken on line 11—11 of FIG. 7.

Each of the legs 136 is pivoted to its tab 128 by bolt 132 extending through a hole in the leg 136 and a hole in the tab 128. A second bolt 134 extends through holes in the leg 136 and in the position shown in full line in FIG. 7 through a hole in tab 128. However, the bolt 134 may be withdrawn from the hole through the tab 128 and the legs 136 rotated about the bolts 132 so that they are free of the ground. The second bolts 134 may be inserted below the edge of the tab 128 to maintain the legs in a position up from the ground much as the same as the legs 36 may be swung free of the ground when they are held up by hook 96. The pin 134 is held in place by spring 146 (FIG. 11). However, it will be noted that at all times the movable support 112 is free to swing in a plane transverse of the pipe 114 which is also to say in a plane transverse the axis of the cylindrical clamp 120.

Foot 138 is pivoted at each end to the end of the legs 136. Inasmuch as the legs 136 do not pivot from the same point, but pivot from points which are peripherally spaced on the pipe 114, it is necessary for there to be a slight pivoting movement from the legs 136 to the foot 138. The foot extends in a plane transverse to the pipe 114. The foot has broad ground engaging surfaces 148 to prevent the foot 138 from sinking into the ground. A skid 150 is attached to the bottom of each leg 136. The skids 150 are broad and the weight of the movable support 112 rides upon one of the skids 150 when the pipe 114 is being moved from one location to another. Also, it will be noted particularly from FIG. 12 that the upper portion of the skid 150 is sloped toward the leg 136. This prevents vegetation or debris from hanging onto the movable support 112 while the pipe 114 is being moved. Were it not for the protection offered by the skid 150, not only is there is a possibility that the movable support 112 would become hung in debris and hold back the system, but also that debris would clog the pivot between the leg 136 and foot 138. Spike 151 on the bottom of the skid 150 insures that the movable support moves under the pipe 114 when the movement of the pipe is reversed.

I have found it desirable to have the legs 136 pivoted to the pipe 114 and peripherally spaced on the pipe because it results in more stability. I.e. referring more particularly to FIG. 6, that the pipe 114 as shown therein is in a more stable position than the pipe 14 supported by the movable support 12 as shown in FIG. 2.

Furthermore, it may be seen that the height of the movable support 12 or 112 must be controlled within certain limits. If it were too long, it would not be possible to cause the pipe 14 or 114 to become supported by it when the vehicles 10 or 110 were reversed. It is found that the height of the movable support 12 or 112 should be less than the distance from the top of the pipe 14 or 114 to the bottom of the ground engaging portion of the vehicle 10 or 110.

I have found it most desirable to have the height of the movable support 12 or 112 to be about two inches shorter than the distance from the bottom of the pipe at vehicle 10 or 110 to the ground. I find that if the movable support supports the pipe at the same height as the vehicle supports the pipe, that this causes the pipe to straighten out. The chord length of the bowed pipe between vehicles is greater if it is straightened out than if it is allowed to remain bowed some. Obviously, it is undesirable to change this chord length between vehicles because in changing it, it introduces stresses within the pipe. Therefore, it has been found that to support the pipe at the movable support about two inches lower than at the vehicles (which is approximately five feet) is desirable.

Further study will reveal that the movable support is basically vertically oriented when it is in the pipe supporting position which is when the pipe has water therein. Furthermore, it will be seen that as the pipe is reversed in direction by the vehicles to move the movable support from the non-support position to the pipe support position, that the pipe will have a certain vertical movement. Specifically, studying FIG. 6, it will be seen that with the legs 136 in the position shown by the broken line, that the distance from the pipe 114 to the bottom of the surfaces 148 is greater than when the legs 136 are in position as shown in the full lines. This indicates that there is vertical movement on the pipe 114. Also, of course, there will be vertical movements upon a portion of the movable support 112, particularly, the clamp 120 portion. Also the movable support 12 of the first embodiment (FIGS. 1–4) will have vertical movement.

As known to the prior art and as shown by prior patent applications, Serial No. 236,474, filed November 5, 1962, and Serial No. 264,507, filed March 12, 1963, in addition to having sprinklers 116 upon the pipe 114, it is desirable to have additional sprinklers 152 which are mounted on a trail tube or long tube 154. Pendant 156 is rigidly attached to the pipe 114 and hangs below the pipe. Short tube 158 is pivoted to the bottom of the pendant 156. Therefore, short tube 158 is connectively pivoted to the pipe 114. Flexible hose 160 forms a water passageway from the pipe 114 into short tube 158. The long tube 154 is pivoted to the short tube 158 at pivot 162. This pivot 162 also forms a water passageway. Therefore, it may be seen that there is a water passageway from the pipe 114 to the long pipe 154 which trails or drags along the ground.

As described above, for the operation of the movable supports 112 it is necessary to reverse the direction of the pipe 114 after it has been moved. If the long tube 154 were rigidly attached to the pipe 114, reversal of the pipe would cause the attachments on the long tube 154 to dig into the ground and malfunction. However, with the short tube 158 pivoted on both ends, when the vehicles 110 are reversed, the tube 154 does not reverse. Also, it will be noted that with the pendant 156 rigidly attached to the pipe 114 and extending below the pipe, the trailing of the long tube 154 does not have as great of a tendency to overturn the vehicles 110. Obviously the lower the point by which the long tube 154 is trailed, the less overturning moment is applied to the system. On a more sophisticated analysis, it will be seen that the drag of the long tube 154 will exert a moment on pendant 156 which is transferred by torque through pipe 114 to the vehicles 112 so that this torque in the pipe 114 tends to reduce weight on the rear wheel 102 and throw more weight on the front wheel 102 when the vehicles 110 are moving forward.

Figure 8:
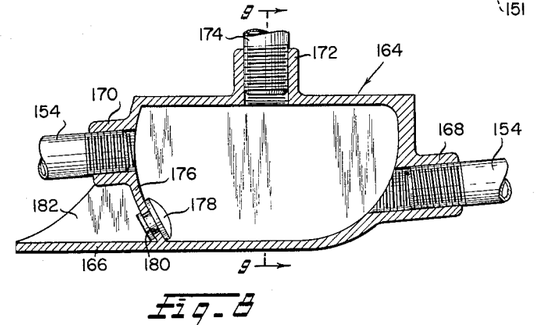
FIG. 8 is a sectional view showing the details of a sled unit carrying an auxiliary sprinkler taken on line 8—8 of FIG. 5.

It is often desirable that more than one auxiliary sprinkler 152 be attached within the long tube 154. I have provided a special connection 164 for this purpose (FIGS. 8 and 9). This connection 164 has a hollow body with a substantially flat lower surface 166 which acts as a sled runner as the long tube 154 pulls the connection along. The connection 164 has a threaded opening 168 in front by which tube 154 is attached thereto. The hollow body also has a threaded opening 170 in the rear thereof by which an extension of a tube 154 is attached. Threaded opening 172 in the top of the connection 164 provides means for attaching riser 174 by which the auxiliary sprinkler 152 is connected to the connector. A portion 176 of the bottom of the connection 164 is curved. The axis of curvature is transverse to the axis of the long tube 154. The radius of curvature of the surface 176 is substantially larger than the radius of curvature of the long tube 154 or of the riser 174. Therefore, standard valve 178 may be used. These rubber valves 178 are commercially available on the market to operate with pipes of two and one-half inch radius to extend through opening 180 in the curved surface 176 so that if there is pressure in the pipe 114 and therefore, long tube 154, the valve 178 flattens against the curved surface 176 and prevents any escape of water. However, if there is no pressure on the pipe 114, the natural resilience of the rubber valve 178 causes it to assume the shape shown in FIG. 8 so as to allow water to flow from the connection 164 thus draining the long tube 154. If the connection of the water passageway 160 is at a low point in the pipe 114, water will also be drained from pipe 114.

As previously mentioned, the connection 164 has a flat lower surface which slides along the ground. This flat lower surface extends behind the curved portion 176 to prevent excess dirt and debris from clogging the opening 180. Web 182 extends from the side portions of the hollow body of connection 164 to the flat extension of the lower surface 166. This web 182 aids in the casting of the connection 164 and it also acts as a shield to give protection to the opening 180.

It will be apparent that the embodiments shown are only exemplary and that various modifications can be made in construction, materials, and arrangement within the scope of the invention as defined in the appended claims.

I claim as my invention:

1. In an irrigation pipe moving system having
    (a) an elongated pipe and
    (b) a plurality of vehicles attached to the pipe for moving the pipe transverse thereof,
        (bb) the length of the pipe between vehicles being such that the pipe will not support itself satisfactorily when full of water;
the improvement comprising:
    (c) a leg
    (d) depending from the pipe
    (e) about equally spaced between vehicles,
    (f) said leg pivoted to the pipe
    (g) to swing freely in a plane transverse to the pipe, and
    (h) a foot of large area on the bottom of the leg,
    (i) said foot extending in a plane transverse to the pipe; so that as the pipe is moved normal to its axis, the leg trails behind the pipe, and when the pipe reaches its destination and is moved back slightly, the leg supports the pipe.

2. In an irrigation system having
    (a) at least two pipe moving vehicles
    (b) a pipe support on each vehicle,
    (c) a pipe adapted to carry water under pressure extending between vehicles attached in said pipe support,
        (cc) the length of the pipe between vehicles being such that the pipe will not support itself satisfactorily when full of water;
the improvement comprising:
    (d) at least one movable support connected to said pipe about equally spaced between vehicles,
    (e) said movable support movable from a pipe support position to a non-pipe support position,
    (f) said movable support forming means for holding up the pipe between vehicles when said pipe has water therein,
    (g) said movable support having a broad ground engaging foot on the bottom thereof,
    (h) said movable support being in a substantially vertical position when in the pipe support position, when the pipe has water therein,
    (i) the pipe and at least a portion of the movable support being movable in a vertical direction as the movable support changes for an on-pipe support position to a pipe support position.

3. In an irrigation system having
    (a) at least two pipe moving vehicles,
    (b) a pipe support on each vehicle,
    (c) a pipe adapted to carry water under pressure extending between vehicles attached in said pipe support,
the improvement comprising:
    (d) at least one movable support connected to said pipe about equally spaced between vehicles,
    (e) said movable support movable from a pipe support position to a non-pipe support position,
    (f) said movable support forming means for holding up the pipe between vehicles when said pipe has water therein,
    (g) said movable support having a broad ground engaging foot on the bottom thereof,
    (h) the change from pipe support position to non-pipe support position is responsive to lateral movement of the pipe.

4. The invention as defined in claim 3 wherein
    (h) said movable support is pivotally connected to said pipe.

5. The invention as defined in claim 3 with the addition of:
    (h) at least one pendant rigidly attached to the pipe and extending below the pipe,
    (i) a short tube pivoted to the bottom of the pendant,
    (j) a long tube pivoted to the bottom of the short tube with a water passageway from the short tube to the long tube, the long tube adapted to carry at least one sprinkler thereon,
    (k) the long tube trailing on the ground, and
    (l) a water passageway from the pipe to the short tube; so that if the pipe is moved in one direction and then reversed a short distance the long tube does not move in the reverse direction.

6. In an irrigation system having
    (a) a pipe adapted to carry water under pressure, and
    (b) at least two spaced vehicles attached to the pipe for supporting and moving same;
the improvement comprising:
    (c) at least one movable support between vehicles including:
    (d) a clamp attached to the pipe about equally spaced between the vehicles,
    (e) two legs pivoted to the clamp
    (f) at points peripherally spaced on the pipe, and
    (g) a foot.
        (gg) the legs sufficiently long for the foot to reach the ground by which the vehicles are supported,
    (h) the foot pivoted at the bottom of each leg; so arranged and constructed that when the pipe is moved that the legs and the foot trails behind the pipe and that slight reverse movement of the pipe moves the pipe onto the legs to be supported thereby.

7. In an irrigation system having
    (a) a pipe adapted to carry water under pressure, and
    (b) a plurality of vehicles attached to the pipe to support and to move same;
the improvement comprising:
    (c) a pivot connected to the pipe,
    (d) a rigid short tube attached to the pivot, and
    (e) a water passageway from the pipe to the short tube,
    (f) a rigid long tube pivoted to the bottom of the short tube with a water passageway from the short tube to the long tube, the long tube adapted to carry at least one sprinkler,
    (g) the long tube trailing on the ground; so that if the pipe is moved in one direction and then reversed a short distance, the long tube does not move in the reverse direction.

8. In a pipe moving system having a pipe adapted to carry water under pressure and at least two spaced vehicles to support and to move said pipe; the method of supporting the pipe between vehicles comprising: supporting the pipe while stationary responsive to a small reverse motion of the pipe, and inactivating the supports by large movement of the pipe.

9. In a pipe moving system having a pipe adapted to carry water under pressure and at least two spaced vehicles to support and move said pipe; the method of supporting the pipe between vehicles comprising: beginning from a status of having the pipe full of water, stationary, and supported; first, draining the water from the pipe; second, moving the pipe a large distance, simultaneously inactivating the support between vehicles responsive to movement; third, reversing the direction of movement of the pipe a small amount, thus supporting the pipe between vehicles responsive to the reversal of direction of travel; and fourth, refilling the pipe with water so that it is in the status of beginning, full of water, stationary, and supported.

10. An irrigation system having
    (a) an elongated pipe adapted to carry water under pressure,
    (b) a plurality of vehicles attached to the pipe to support and move same,
    (c) a shaft journaled along the pipe, and
    (d) means on each vehicle for propelling the vehicle responsive to rotation of the shaft,
    (e) said means on each vehicle requiring the shaft to be vertically aligned with the pipe;

the improvement comprising in combination:
(f) an obstruction between vehicles requiring the shaft be moved to one side of the pipe,
(g) said shaft journaled to the pipe on one side of the pipe between a selected pair of vehicles and said shaft journaled to the pipe on the other side of the pipe between the vehicles on each side of said selected pair.

11. The invention as defined in claim 10 wherein
(h) said obstruction is a movable support means for supporting the pipe while the pipe is stationary and which is moved by the pipe in a non-support position when the pipe is moved.

12. In a sprinkler system having a water pipe with at least a pair of frames secured to said pipe at spaced intervals to support said pipe at a selected distance above the ground and parts thereon powered to move said pipe sideways in either direction; the combination which comprises:
(a) a long sprinkler tube extending perpendicular to the axis of said pipe,
(b) a drag linkage of length not greater than the height of said pipe above the ground,
(c) connected between said pipe and the head of said long tube, and
(d) movable only in a plane perpendicular to the axis of said pipe, and
(e) a fluid passageway between said pipe and said long tube.

13. In a sprinkling system having a water pipe with at least one pair of frames secured to said pipe at spaced points thereon to support said pipe at a selected distance above the ground, and powered to move said pipe sideways in either direction; the combination which comprises:
(a) a support affixed to said pipe between said frames as to swing in a first plane transverse to the axis of said pipe, and of length to support said pipe at an intermediate point the same distance above the ground as at said frames,
(b) a long sprinkler tube extending perpendicularly to said axis,
(c) a pendant drag linkage of length not greater than said distance connected between said pipe and the head of said long tube, and
(d) movable only in a second plane parallel to said first plane, and
(e) a flow connection between said pipe and said long tube.

References Cited by the Examiner
UNITED STATES PATENTS

| | | | |
|---|---|---|---|
| 608,011 | 7/1898 | Staples | 254—94 X |
| 850,830 | 4/1907 | Gordon | 254—94 X |
| 1,048,722 | 12/1912 | Morgan | 254—94 X |
| 1,966,783 | 7/1934 | Balaam | 239—212 |
| 2,474,483 | 6/1949 | Luttrell | 280—150.5 |
| 2,497,372 | 2/1950 | Pricer | 272—86 X |
| 2,534,723 | 12/1950 | Meese | 285—5 |
| 2,638,967 | 5/1953 | Morton et al. | 272—85 |
| 2,726,895 | 12/1955 | Behlen | 239—155 |
| 2,796,292 | 6/1957 | Maggart | 239—213 |
| 2,892,466 | 6/1959 | Stilwell et al. | 137—344 |
| 2,896,858 | 7/1959 | Price | 137—344 X |
| 2,915,081 | 12/1959 | Warren | 137—344 |
| 2,931,579 | 4/1960 | Ruddell | 239—179 |
| 3,145,013 | 8/1964 | Grudoski | 272—85 X |

M. CARY NELSON, *Primary Examiner.*

HENRY T. KLINKSIEK, *Examiner.*

UNITED STATES PATENT OFFICE
CERTIFICATE OF CORRECTION

Patent No. 3,230,969                                January 25, 1966

Rufus J. Purtell

It is hereby certified that error appears in the above numbered patent requiring correction and that the said Letters Patent should read as corrected below.

Column 7, line 46, for "for an on-pipe" read -- from a non-pipe --.

Signed and sealed this 20th day of December 1966.

(SEAL)

Attest:

ERNEST W. SWIDER
Attesting Officer

EDWARD J. BRENNER
Commissioner of Patents